United States Patent
Glatfelter et al.

(10) Patent No.: US 8,855,303 B1
(45) Date of Patent: Oct. 7, 2014

(54) CRYPTOGRAPHY USING A SYMMETRIC FREQUENCY-BASED ENCRYPTION ALGORITHM

(71) Applicant: The Boeing Company, Chicago, IL (US)

(72) Inventors: John W. Glatfelter, West Chester, PA (US); Christopher W. Raab, Mullica Hill, NJ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/705,480

(22) Filed: Dec. 5, 2012

(51) Int. Cl.
*H04L 9/00* (2006.01)
*H04L 9/08* (2006.01)

(52) U.S. Cl.
CPC .................................. *H04L 9/0861* (2013.01)
USPC ................. 380/44; 380/277; 713/171; 726/1; 726/36

(58) Field of Classification Search
None
See application file for complete search history.

(56) References Cited

U.S. PATENT DOCUMENTS

| | | | | |
|---|---|---|---|---|
| 6,675,146 | B2* | 1/2004 | Rhoads | 704/270 |
| 7,231,271 | B2* | 6/2007 | Gopalan et al. | 700/94 |
| 7,308,099 | B1* | 12/2007 | Allamanche et al. | 380/210 |
| 7,764,789 | B2* | 7/2010 | Goettfert et al. | 380/44 |
| 7,965,761 | B2* | 6/2011 | Shattil | 375/147 |
| 8,015,001 | B2* | 9/2011 | Suzuki | 704/225 |
| 2002/0018580 | A1* | 2/2002 | Maeda | 382/100 |
| 2004/0141613 | A1* | 7/2004 | Hayashi | 380/28 |
| 2005/0123138 | A1* | 6/2005 | Abe et al. | 380/255 |
| 2006/0072753 | A1* | 4/2006 | Nishimura | 380/262 |
| 2008/0037788 | A1* | 2/2008 | Togawa et al. | 380/275 |
| 2010/0220859 | A1* | 9/2010 | Lu et al. | 380/255 |
| 2011/0268279 | A1* | 11/2011 | Ishikawa et al. | 381/22 |
| 2012/0254612 | A1* | 10/2012 | Rane et al. | 713/168 |

OTHER PUBLICATIONS

R. Sridevin, Dr. A. Damodaram and Dr. Svl.Narasimham, "Efficient Method of Audio Steganography by Modified LSB Algorithm and Strong Encryption Key With Enhanced Security," Journal of Theoretical and Applied Information Technology; 2005-2009, pp. 768-771.

* cited by examiner

*Primary Examiner* — Michael S McNally
*Assistant Examiner* — Khoi Le
(74) *Attorney, Agent, or Firm* — Kunzler Law Group, PC; Baldwin Quan

(57) ABSTRACT

Systems and method for implementing an encryption technique by combining matrix mathematics, audio frequencies, and symmetric key. Data encryption/decryption may be performed using symmetric key based implementations, with the encryption keys being derived from unique sequences of frequencies (e.g., either in written or audible form). In this regard, the encryption key may be derived from a reference signal, which may comprise a plurality of different frequencies, and the generating of the encryption key is based on assigning values to the plurality of different frequencies and/or to one or more attributes associated with the reference signal or elements (e.g., particular portions, such as notes or frequencies) thereof. The data may then be encrypted based on the generated encryption key, wherein the encrypting of the data comprises encrypting plaintext values. The encryption/decryption may be performed directly, based on the symmetric frequency-based key generation, and/or in conjunction with existing encryption algorithms (e.g., AES).

16 Claims, 7 Drawing Sheets

CRYPTOGRAPHY USING A SYMMETRIC FREQUENCY-BASED ENCRYPTION ALGORITHM

FIELD

Certain embodiments of the disclosure relate to communications. More specifically, certain embodiments of the disclosure relate to an apparatus and method for a cryptography using a symmetric frequency-based encryption algorithm.

BACKGROUND

Various measures may be used to ensure secure communications. For example, securing communications may comprise use of encryption to protect communicated data against unwanted access. In this regard, encryption may allow converting data from its original, ordinary form (e.g., plaintext) to a corresponding encrypted form which is typically unintelligible (e.g., ciphertext), in accordance with an encryption standard and/or algorithm, such that any unauthorized recipient (whether by accident or by deliberate interception) may not be able to view the original data, without knowing particular encryption algorithm(s) used and/or any pertinent parameters or information (e.g., encryption/decryption keys) necessary for decrypting the data. Various encryption standards and/or algorithms are currently developed and/or used. These encryption standards and/or algorithms may be categorized into different types and classes, such as based on the way the encryption/decryption are applied to the data, the mechanisms by which the encryption/decryption are applied, and/or characteristics of parameters (e.g., keys) used in the encryption/decryption.

For example, some algorithms may be classified as being block cipher based algorithms, meaning that they operate on fixed-length (e.g., particular number of bits) chunks of data, called blocks. On the other hand, in stream cipher based algorithms encryption may comprise combining plaintext digits with a cipher digit stream (e.g., a keystream), to generate the encrypted data, whereby each plaintext digit may be encrypted one at a time with the corresponding digit of the keystream. Some encryption and/or ciphering algorithms may comprise use of hash functions, such as SHA-based algorithms, in which fixed-size bit strings may be generated based on arbitrary blocks of data. Some encryption algorithms may be classified as symmetric-key algorithms, in which communication peers use the same key during encryption and decryption operations—i.e., the same key would be used in encrypting the data at the sender end and in decrypting the received ciphertext at the receiving end. The keys used in symmetric-key operations may be preselected and/or preconfigured (e.g., into the communicating peers), or may be generated dynamically using methods that are configured to ensure that the keys (used by both peers) match. Symmetric-key algorithms include block cipher algorithms, such as the Data Encryption Standard (DES) based algorithm(s) and Advanced Encryption Standard (AES) based algorithm(s), and stream cipher algorithms, such as RC4.

Another class of encryption algorithms is public-key based algorithms, such as the RSA algorithm. In this regard, public-key algorithms incorporate asymmetric-key design, in which two separate keys, one of which is public (i.e., widely known and/or distributed) and the other is private (i.e., only known by particular peer), are typically used. The keys may be mathematically linked, which enables them to be utilized for data encryption and decryption. In this regard, the data may be encrypted using one key (and/or key combination) while the data decryption is performed using the other key (and/or another key combination). For example, in RSA based operations data is encrypted using a public key which is known by all recipients, whereas decryption requires, in addition to the public key, a private key specific to each recipient and used particularly for decryption by that recipient.

While currently used encryption algorithms may provide a measure of security and/or with respect to data communications, certain risks may continue to exist. For example, even encrypted data may be susceptible when encryption keys can be readily and/or easily obtained (directly or indirectly—e.g., by use of guess, brute-force search, and/or Dictionary Program based methods) by un-authorized persons. Accordingly, optimizing and/or improving encryption remains an ongoing objective, particularly with respect to encryption keys and the use thereof.

Further limitations and disadvantages of conventional and traditional approaches will become apparent to one of skill in the art, through comparison of such systems with some aspects, as set forth in the remainder of the present application with reference to the drawings.

SUMMARY

An apparatus and/or method is provided for a cryptography using a symmetric frequency-based encryption algorithm, substantially as shown in and/or described in connection with at least one of the figures, as set forth more completely in the claims.

In one aspect, a method may be implemented and/or used in encrypting data, such as for communication thereof. The method may comprise generating an encryption key based on a reference signal, wherein the reference signal comprises a plurality of different frequencies, and the generating of the encryption key is based on assigning values to the plurality of different frequencies and/or to one or more signal attributes. The data may then be encrypted based on the generated encryption key, wherein the encrypting of the data comprises encrypting plaintext values.

In another aspect, a system comprising one or more circuits may be configured for use in encrypting data. In this regard, the one or more circuits may be configured to generate an encryption key based on a reference signal, wherein the reference signal comprises a plurality of different frequencies, and the generating of the encryption key is based on assigning values to the plurality of different frequencies and/or to one or more signal attributes. The one or more circuits may then be configured to encrypt data based on the generated encryption key, wherein the encrypting of the data comprises encrypting plaintext values.

These and other advantages, aspects and novel features, as well as details of an illustrated embodiment thereof, will be more fully understood from the following description and drawings.

The features, functions, and advantages that have been discussed can be achieved independently in various embodiments or may be combined in yet other embodiments further details of which can be seen with reference to the following description and drawings.

DETAILED DESCRIPTION

Certain embodiments may be found in a method and system for a cryptography using a symmetric frequency-based encryption algorithm. Many specific details of certain embodiments are set forth in the following description as well as the drawings to provide a thorough understanding of such embodiments. One skilled in the art, however, will understand that there may be additional embodiments, or that certain of these embodiments may be practiced without several of the details described in the following description Like numbers refer to like elements throughout.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

Figure 1:
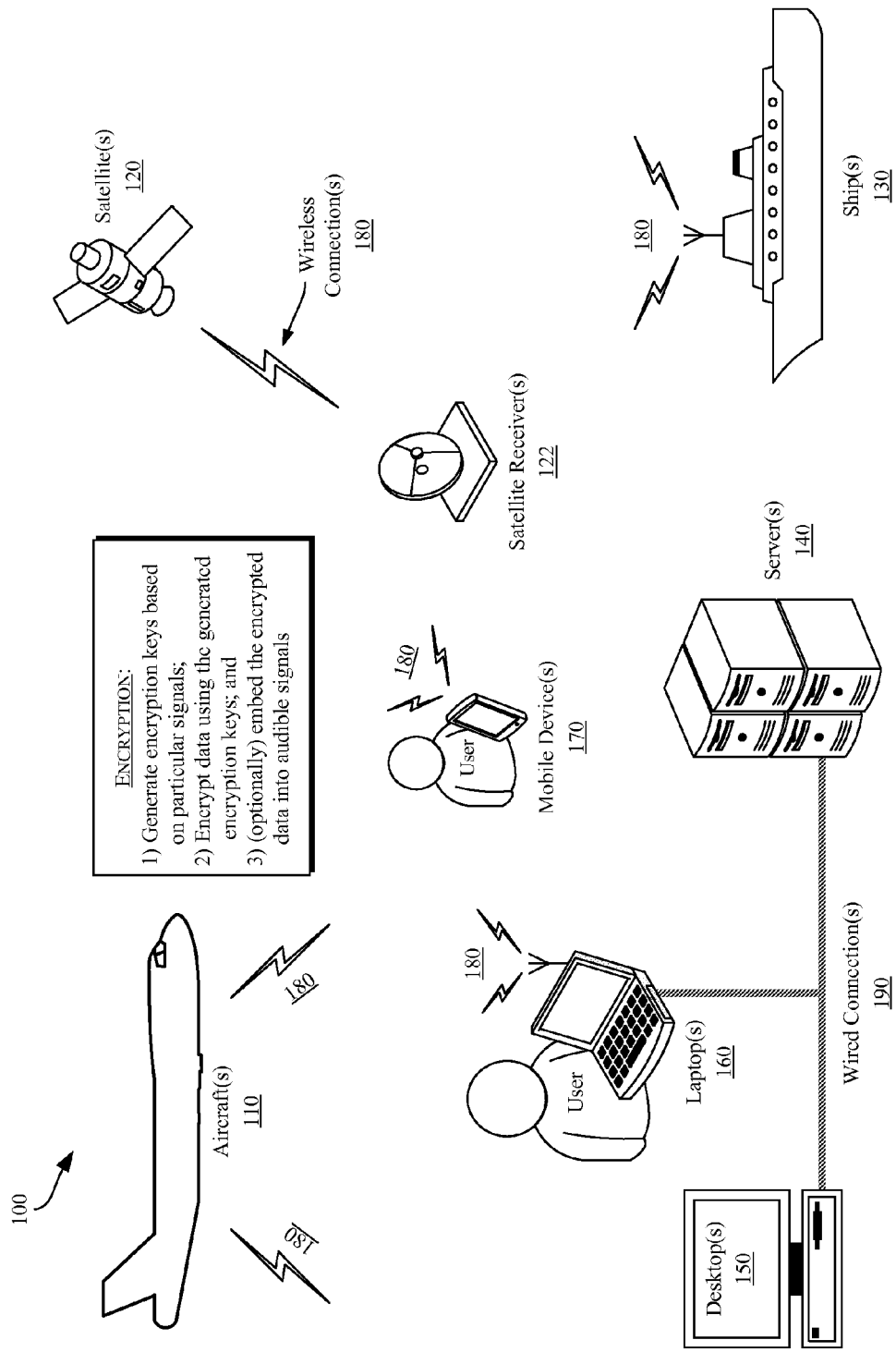
FIG. 1 is a diagram illustrating a communication environment in which symmetric frequency-based encryption may be used, in accordance with an advantageous embodiment.

FIG. 1 is a diagram illustrating communication environment in which symmetric frequency-based encryption may be used, in accordance with an advantageous embodiment. Referring to FIG. 1, there is shown a communication environment 100.

The communication environment 100 may comprise different types of communicative systems or devices, which may support and/or enable communication of data, such as via wired and/or wireless connections. For example, communicative systems or devices may comprise aircrafts 110, satellites 120, satellite receivers 122 (e.g., satellite TV receivers, satellite phones, and the like), ships 130, computer systems (including, e.g., servers 140, desktops 150, and laptops 160), mobile devices 170 (e.g., cellular phones, smartphones, tablets, and the like). The invention, however, is not limited to any particular communication system or device.

In operation, various devices or systems may be engaged in and/or be used for communication of data (to and/or from these devices or systems). In this regard, various types of communications may be used by the devices or systems. For example, devices or systems may be utilized or be engaged in wireless communications 180 (e.g., cellular, WiFi, satellite, Bluetooth, etc.) and/or in wired based communications 190 (e.g., Ethernet, Fiber, etc.). In some instances, devices or systems may be configured to communicate while moving, particularly using wireless communications 180. For example, the aircrafts 110 may utilize wireless connections 180 to receive data (e.g., navigational and/or weather information or updates, such as from satellites 120; and/or communications, such as from other aircrafts, airports or home bases, ships 130, or even individuals on the ground with proper communication systems), and/or may transmit data (e.g., communicating with other aircrafts, airports or home bases, ships 130, and/or even individuals on the ground with proper communication systems).

In many instances, it may be desirable to control and/or limit access to communicated data. For example, the communicated data may comprise private personal information or sensitive business or government information, and/or the data communication may be performed in conjunction with particular types of operations that may necessitate or mandate secure communications or controlled access to communicated data (e.g., communication relating to military or law enforcements operations). Accordingly, particular measures may be utilized to secure communication data (and/or to protected the communicated data, such as by ensuring controlled and/or limited access to the communicated data. For example, communication of (and access to) data may be secured by use encryption. In this regard, encryption and/or decryption protocols and/or algorithms may be utilized to protect and/or ensure validity of data, such as data exchanged during communications, whereby exchanged data may be encrypted or ciphered by the sending device (or system), with the receiving device (or system) having to apply a corresponding decryption on the received encrypted data before being able to access and/or use the data.

The data encryption may be performed in accordance with one or more encryption algorithms or protocols. In this regard, various types or classes of encryption or ciphering algorithms may be available. The encryption algorithms may be classified, for example, based on the manner by which they are applied to the data. For example, some encryption algorithms (block cipher based algorithms) may be configured to operate on chunks of data (typically fixed-length—e.g., particular number of bits), called blocks; whereas other encryption algorithms (stream cipher based algorithms) may entail combining data (plaintext) with a cipher stream (a keystream), to generate the encrypted data.

In many instances, encryption algorithms are configured or implemented such that data protection is achieved by converting the data from its original and/or ordinary form (i.e., plaintext) to a corresponding encrypted form that is typically unintelligible or gibberish (e.g., ciphertext). Only authorized recipients may then be configured to convert the data back to its original/ordinary form (plaintext) from received encrypted from (ciphertext). In many instances, data conversions during encryption/decryption may be achieved using particular information, such as encryption keys for example. In this regard, encryption keys may be combined with and/or used in manipulating the data during conversions, such as from plaintext to ciphertext (during encryption) and/or from ciphertext to plaintext (during decryption). Encryption algorithm that use keys may vary based on the type of keys and/or manner of use of keys by the algorithms. For example, in symmetric-key (or single-key) encryption algorithms, such as Advanced Encryption Standard (AES) based algorithm(s), the same key may be used to encrypt the plaintext and to decrypt the ciphertext. Accordingly, the encryption key must be kept secret because otherwise any recipient in the possession of the key would be able to decrypt the data.

In asymmetric-key (or two-key, or public-key) algorithms, such as the RSA algorithm, different keys (or key combinations) may be used for encrypting the plaintext and for decrypting the ciphertext. For example, a public key (i.e., key known by all) may be used for encryption whereas each particular recipient may use a distinct private key (only known by that recipient) is used for decryption. Asymmetric-key algorithms provide enhanced security (i.e., are harder to break), but the enhanced security typically comes at the expense of performance (e.g., being significantly slower than symmetric-key algorithms). In some instances, encryption algorithms may implement hybrid design—e.g., a randomly generated key may be used to symmetrically encrypt and decrypt a data, and the key itself is encrypted using a public-key algorithm. Use of such hybrid design may be more efficient than using the asymmetric-key approach to encrypt the whole message.

In instances where the encryption algorithm uses keys, the quality or performance of the algorithm (i.e., the quality or reliability of the data protection provided thereby) may dependent on the security of the keys themselves—i.e., the harder it is to obtain or determine the keys in unauthorized manner, the more secure the data encryption (and thus any communication thereof) would be. Accordingly, data encryption may be enhanced by improving or optimizing key generation.

For example, in various implementation keys may be generated based on particular information, in a manner that would make breaking the keys by unauthorized parties extremely difficult. The particular information may comprise, for example, a reference signal, whereby the key(s) may be generated based on various aspects of the reference signal. For example, the reference signal may comprise a plurality of different frequencies, with each of the frequencies having one or more particular characteristics associated therewith (e.g., pitch, intonation, duration, amplitude, loudness, octave, etc.). The key(s) may be generated based on the reference signal by different means. For example, in some implementations, particular numerical values may be assigned to various aspects relating to signals (e.g., to each possible frequency, and/or to each possible value of each of the one or more characteristics). The key(s) may then be generated based on the resultant sequence of values, as determined based on the particular sequence of frequencies and/or the particular characteristics thereof. In some instances, symmetric frequency-based key generation may be used only in generating the keys—i.e., the actual encryption/decryption is performed using an existing algorithm (e.g. AES), with key generating being configured such that the keys which would conform to the requirements of the applicable algorithm(s)—e.g., structure, length, etc. In other instances, however, frequency-based based key generation may be implemented as part of a symmetric frequency-based algorithm—i.e., for generating the keys symmetrically based on reference signal(s), with encryption/decryption being also particularly performed and/or configured in accordance with symmetric frequency-based key generation. An example implementation of symmetric frequency-based key generation and/or encryption/decryption is described in more detail in FIGS. 2A-2C.

Figure 2A:
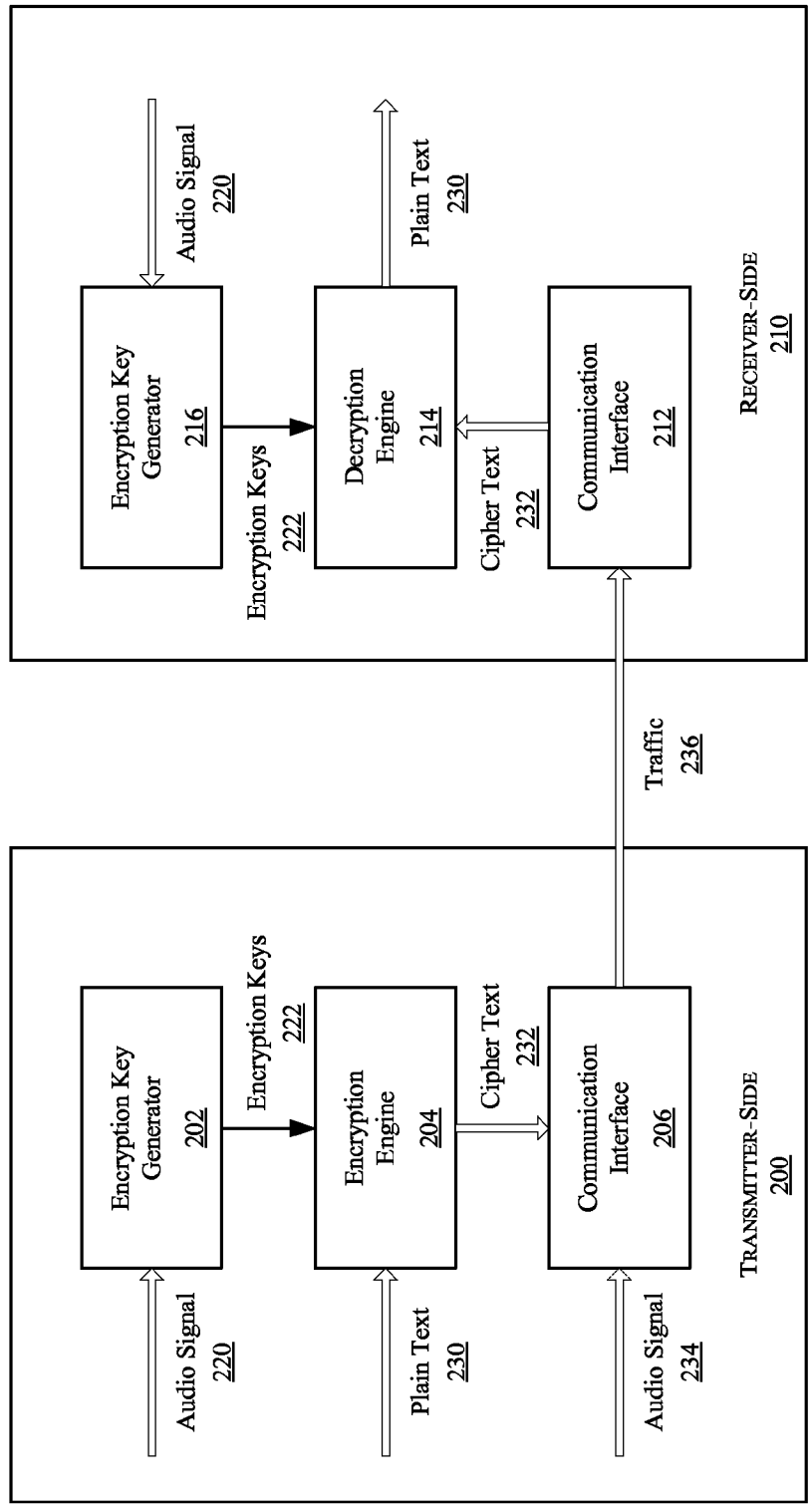
FIG. 2A is a diagram illustrating application of symmetric frequency-based encryption during data communication, in accordance with an advantageous embodiment.

FIG. 2A is a diagram illustrating application of symmetric frequency-based encryption during data communication, in accordance with an advantageous embodiment. Referring to FIG. 2A, there is shown a communication setup, comprising a transmitting-side system 200 and a receiving-side system 210.

Each of the transmitting-side system 200 and the receiving-side system 210 may comprise suitable circuitry, interfaces, logic, and/or code configured to communication data in secured manner, such as by use of encryption algorithms. The transmitting-side system 200 and the receiving-side system 210 may correspond to any communicative device or system of FIG. 1 (e.g., aircrafts 110, satellites 120, ships 130, etc.), and/or to dedicate component thereof. For example, the transmitting-side system 200 and/or the receiving-side system 210 may be integrated into such objects as aircrafts 110, satellites 120, and/or the ships 130 for use therein in implementing encryption/decryption related functions or operations.

In operation, the transmitting-side system 200 and the receiving-side system 210 may be configured to support use of encryption algorithms. In particular, the transmitting-side system 200 and the receiving-side system 210 may be configured to support use of data encryption with key generation based on reference signals. For example, the data encryption performed in the communication setup may incorporate a symmetric frequency-based algorithm, in which the key(s) used in encrypting and/or decrypting communicated data may be generated based on various aspects of a reference signal that may comprise a plurality of different frequencies, with each of the frequencies having one or more particular characteristics associated therewith (e.g., pitch, intonation, duration, amplitude, loudness, octave, etc.).

An example operation of the communication setup is described herein, whereby data is to be communicated from the transmitting-side system 200 to the receiving-side system 210. On the transmitting-side, the transmitting-side system 200 may comprise an encryption key generator 202, which may be configured to generate encryption keys 222 based on a reference signal (e.g., an audio signal 220). An encryption engine 204 in the transmitting-side system 200 may be used to encrypt the plaintext 230 which may correspond to the data that is to be communicated. In this regard, the encryption engine 204 may be configured to support one or more algorithms (e.g., AES or the like), and may utilize for the encryption, the encryption keys 222 generated by the encryption key generator 202. In some instances, the encryption engine 204 may be configured to performed additional operations that may be necessary to facilitate the data encryption. For example, in some instances, plaintext may be mapped to numerical values, as explained in more detail below. At the conclusion of data encryption, the encryption engine 204 may generate, based on the plaintext 230, a ciphertext 232. The ciphertext 232 may be forwarded to a communication interface 206, which may be configured to handle communication of data in the transmitting-side system 200. In this regard, the communication interface 206 may be configured to format the data (regardless of it being encrypted or not) for communication in accordance with particular communication medium and/or protocol (e.g., into Ethernet or WiFi packets), performing any necessary operations needed for that communication (e.g., encapsulation, MAC/PHY related processing, etc.). The data may then be communicated as network (wired and/or wireless) traffic 236.

On the receiving-side, the receiving-side system 210 may comprise a communication interface 212, which may be configured to handle communication of data in the receiving-side system 210, generally in similar manner as done by the communication interface 206. In this regard, the communication interface 212 may be configured to handle network traffic (e.g., network traffic 236) which had been formatted and/or configured for communication in accordance with particular communication medium and/or protocol (e.g., as Ethernet or WiFi packets). For example, the communication interface 212 may be operable to perform necessary communication functions or operations needed to extract the actual payload from received packets (e.g., decapsulation, MAC/PHY related processing, etc.). In instances where the data (in the payload) had been encrypted (e.g., the ciphertext 232), the received encrypted data may be forwarded to other components for decryption thereof. For example, the receiving-side system 210 may comprise a decryption engine 214, which may be configured to perform data decryption (e.g., on extracted plaintext 230). In this regard, the decryption engine 214 may be configured to support one or more algorithms, which would have to include the algorithm(s) used by the transmitting-side system 200 to ensure successful decryption. Thus, the decryption engine 214 would require proper key(s) to enable decryption of the ciphertext 232. Accordingly, the receiving-side system 210 may comprise an encryption key generator 216, which may be configured to generate any key(s) needed for data decryption via the decryption engine 214. In some instances, the keys used by the decryption engine 214 may be the same as for the encryption engine 204 (e.g., when using symmetric-key based designs). Accordingly, the encryption key generator 216 may be configured to generate the encryption keys 222 based on the same reference signal (e.g., the audio signal 220). Once the encryption keys 222 are generated, the keys may be sent to the decryption engine 214, which may utilize the encryption keys 222 generated by the encryption key generator 202 to decrypt the ciphertext 232 to regenerate the original plaintext 230. As with the encryption engine 204, in some instances, the decryption engine 214 may be configured to perform additional operations that may be necessary to facilitate the data decryption (e.g., mapping between characters and numerical values, as explained in more detail below).

In various implementations, the encryption keys 222 may be generated based on the reference signal (the audio signal 220) by different means, such as based on unique aspects associated with the audio signal 220. For example, a sequence of numerical values may be determined based on the audio signal, based on such attributes as the particular sequence of frequencies contained therein, and/or the particular signal characteristics (e.g., associated with each particular frequency), such as loudness, amplitude, duration, etc. An example of key generation based on a particular audio signal is described in more detail in FIG. 2B.

In some instances, additional information may be communicated along with encrypted data (ciphertext 232), such as to facilitate and/or support decryption operations at the receiving side. For example, in addition to the encrypted data (ciphertext 232), the transmitting-side system 200 may also communicate the reference signal (e.g., the audio signal 220) or portion(s) thereof, information corresponding to the reference signal (e.g., the sequence of numbers), and/or the encryption keys 222 or portion(s) thereof.

In some instances, for an added measure of security, the encrypted data (and any additional information communicated therewith) may be mixed with data or signals during communication of the data. For example, the ciphertext 232 may be mixed with a base audio signal 234, which may not need to be protected. The base audio signal 234 may comprise music or random speech for example. Furthermore, to enhance security even more, the encrypted data (i.e., the ciphertext 232) may be configured as inaudible content that may be embedded in the base audio signal 234, thus allowing for communication of the encrypted data transparently (i.e., unnoticed). In some instances, rather than communicating the encrypted data (and any additional information) directly, it may be written into a storage medium (e.g., CD), preferably as inaudible content.

Figure 2B:
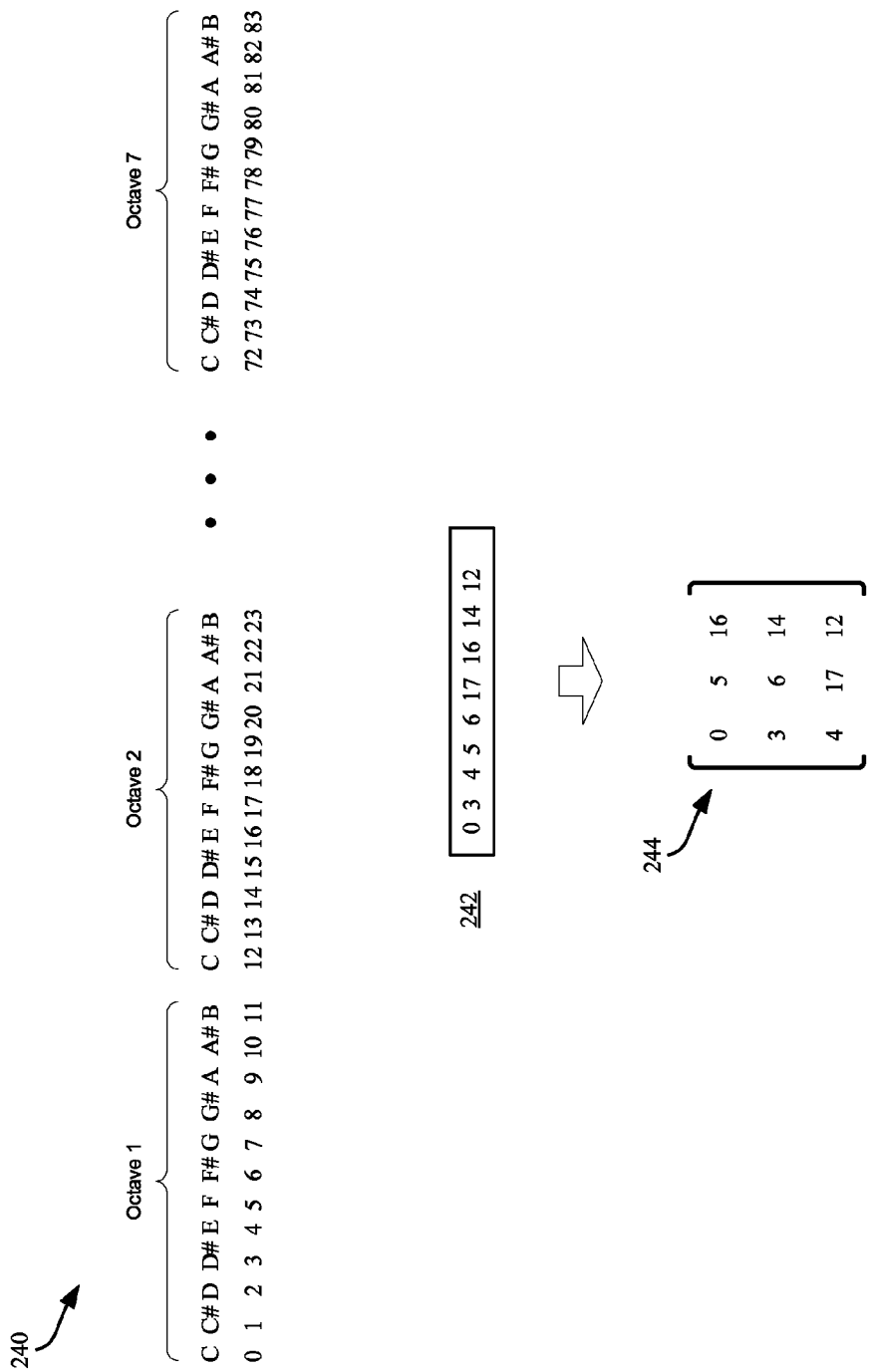
FIG. 2B is a diagram illustrating generation of encryption keys for use in symmetric frequency-based encryption, in accordance with an advantageous embodiment.

FIG. 2B is a diagram illustrating generation of encryption keys for use in symmetric frequency-based encryption, in accordance with an advantageous embodiment.

In symmetric frequency-based algorithms, key(s) used in encrypting and/or decrypting data may be generated based on a reference signal that may comprise a plurality of different frequencies, with each of the frequencies having one or more particular characteristics associated therewith (e.g., pitch, intonation, duration, amplitude, loudness, octave, etc.). In this regard, the keys may be generated based on assigning values to various aspects of the reference signal, such as the different frequencies and/or the different possible values of the different signal characteristics associated therewith. For example, in some implementations, data encryption may be performed using symmetric music based keys, wherein a sequence of musical notes, either in written or audible form, may be used in generating a symmetric key (i.e., the single key that is utilized for both encrypting the plaintext and decrypting the ciphertext). In this regard, a single key may represent a sequence of musical notes used for encryption and the same sequence may be used for decryption—i.e., the sequence of musical notes is used at the transmitting-side (e.g., in the transmitting-side system 200) in generating the encryption keys 222, which are used in turn in generating the ciphertext 232 based on the plaintext 230, and the plaintext 230 can only be extracted (by decrypting the ciphertext 232) at the receiving-side by the using the exact same sequence of musical notes to generate the exact same encryption key 222. In some implementations, the note sequence (or chord sequence) may be converted into an encryption matrix.

For example, the reference signal may be based on combination of chromatic scale (CS) notes. In this regard, a single chromatic scale (CS) would typically have 12 notes—a standard G-Clef scale includes the notes: C, C#, D, D#, E, F, F#, G, G#, A, A#, and B. The total number of notes available may differ from musical instrument to another, with some instruments having longer chromatic scales, corresponding to multiple octaves. For example, pianos may have a full chromatic scale (FCS) that comprises ~90 notes (based on having 7 standard octaves, corresponding to 7 repetitions of the 12 CS notes, plus a minor third). Accordingly, use of sequences of musical notes in generating an encryption key may entail assigning values to each of the available CS notes. Thus, a musical sequence may be represented using the values corresponding to the CS notes included therein. In addition to assigning values to the notes (i.e., pitches), in some instances values may also be assigned to additional characteristics to increase the possible range of values that may be assigned to a particular musical sequence. For example, each note may be assigned a particular duration value (e.g., one of three possible values: 1, 2, and 3, connoting short, medium, and long durations), which may assigned based on the note duration—that is how many seconds to hold the note—in a particular note sequence. Thus, in an example implementation where values are based on FCS notes and on having 3 possible durations, the number of opportunities (i.e., possible values) may increase to 270 different possibilities. Therefore, when generating a 9-note musical sequence (e.g., musical sequence 242), based on a piano FCS 240, with all 3 possible duration values, there may be one of $7.6256 \times 10^{21}$ (i.e., 7000 trillion) possible combinations.

In some implementations, the note sequence (or chord sequence) may be converted into an encryption matrix. For example, a 9-note musical sequence (e.g., musical sequence 240) may be arranged as a 3×3 matrix (the matrix 244), which would then be used as the encryption key. In other words, rather than using the encryption key as a sequence of numerical values, the values thereof are arranged as matrix, which may be used in converting the plaintext (i.e., encrypting it) by use of matrix math, such as after arranging values corresponding to the plaintext into a data matrix. In some instances, the vector columns of such encryption matrices may simply be selected from range of all available values (e.g., selected from a range of values that is determined based on combination of possible values—that is those corresponding to all possible frequencies, and/or to all possible attributes for each frequency). In other instances, however, encryption matrices may be configured more particularly. For example, a 3×3 encryption matrix may be configured such that a column vector may correspond to frequency values, another column vector may correspond to tone duration values, and the final column vector may represent note amplitude values. An example implementation of an encryption matrix based encryption/decryption is described in more detailed in FIG. 2C.

Figure 2C:
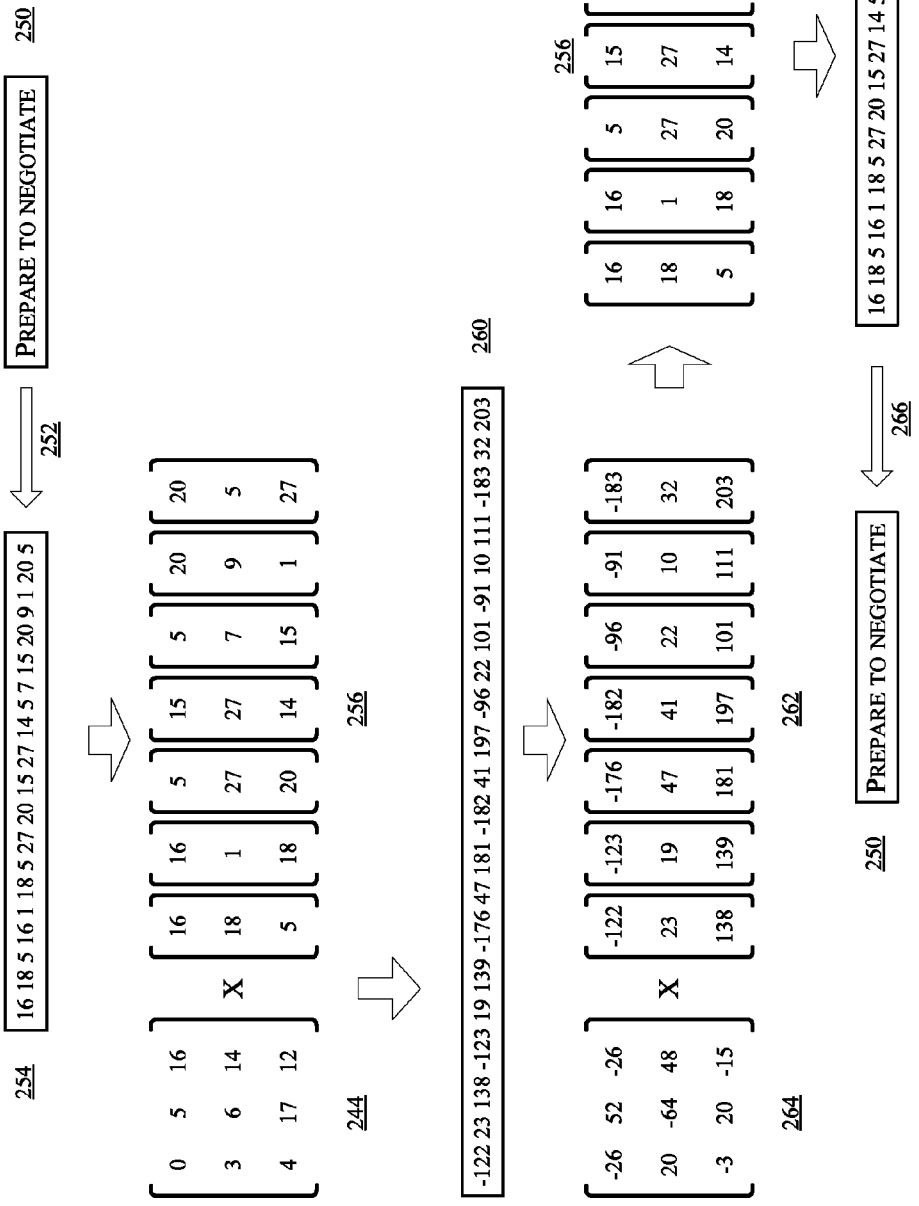
FIG. 2C is a diagram illustrating use of encryption keys generated based on a symmetric frequency-based encryption during data encryption, in accordance with an advantageous embodiment.

FIG. 2C is a diagram illustrating use of encryption keys generated based on a symmetric frequency-based encryption during data encryption, in accordance with an advantageous embodiment.

As shown in FIG. 2C, data encryption may be implemented using symmetric music based keys, whereby the keys (and the data) may be arranged as matrices. A plaintext 250 (corresponding to data that is to be communicated securely) may initially be converted 252 into a corresponding numerical sequence 254. In this regard, converting plaintext to numerical sequences may entail use or application of a particular mapping between plaintext characters and corresponding numerical values—i.e., each possible character may be assigned (and mapped to) a particular unique numerical value. For example, each letter of the alphabet (e.g., A to Z) may be mapped into a corresponding numerical value (e.g., 1 to 26; thus 'A' is mapped to 1, 'B' is mapped to 2, and so on). Additionally, non-letter characters may also be assigned numerical values (e.g., spaces, such as between words, may be mapped to numerical value 27). Once the mapping is complete, the numerical sequence 254 may be rearranged into unencrypted data matrix 256. In this regard, the unencrypted data matrix 256 may be configured based on the key being used for data encryption. For example, the data encryption may be performed using encryption keys that are generated based on predetermined sequence of music notes (e.g., musical sequence 242). In this regard, in the particular implementation shown in FIG. 2C, the encryption may be performed using the encryption matrix 244. Accordingly, data encryption may be achieved by means of matrix multiplication—e.g., by multiplying the encryption matrix 244 and the unencrypted data matrix 256 (thus, configuring the unencrypted data matrix 256 may depend on the configuration of the encryption matrix 244—e.g., when the encryption matrix 244 is configured as 3×3 matrix, the unencrypted data matrix 256 may be configured as N 3×1 matrices). The solution matrix (resulting from the multiplication) may then be rewritten as a list of numbers 260, with no evidence of its original matrix structure (i.e., no columns or commas). In this regard, the conversion from matrix to list may also be design or implementation dependent (being used in further enhancing the security of the encryption and/or communication of the encrypted data).

On the receiving-side, decrypting the received list 260 may entail rewriting the string list 260 into matrix form, resulting in encrypted data matrix 262, which may be structured and/or configured based on the structure of encryption keys/matrix that will be used in the decryption (e.g., comprising a sequence of N 3×1 column matrices when using the 3×3 encryption/decryption matrices). The unencrypted data matrix 256 may then be regenerated from the encrypted data matrix 262, such as by multiplying encrypted data matrix 262 with a matrix 264, which may be the inverse of the encoding matrix 244. The numerical sequence 254 may then be (re)generated from the unencrypted data matrix 256, and the original plaintext 250 may in turn be (re)generated 266 from the sequence 254, such as by using the same numerical mapping of plaintext characters applied on the encryption side (although it may be applied in reverse manner at the receiving end—i.e., applying mapping from numerical values to plaintext characters).

Figure 3:
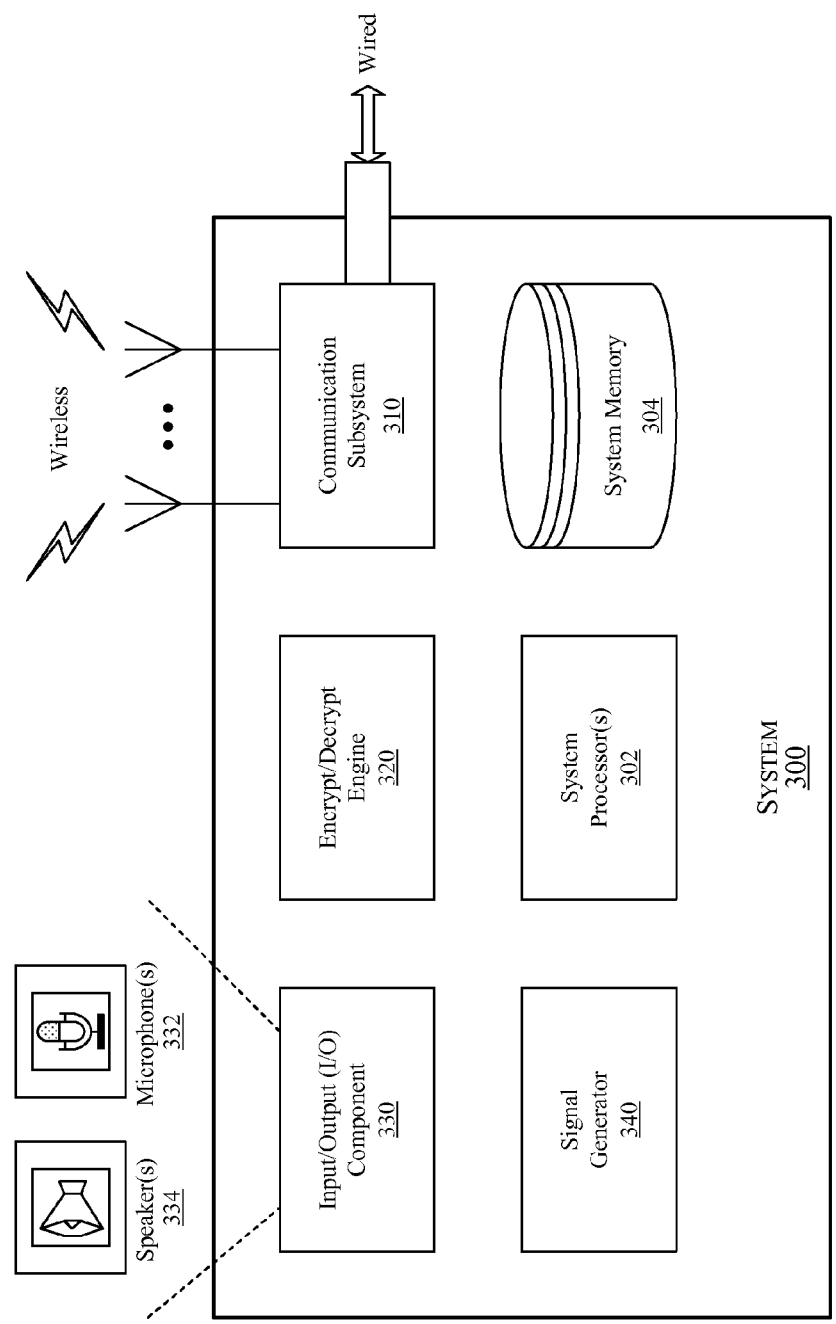
FIG. 3 is a diagram illustrating a system that may be configured to utilize or support symmetric frequency-based encryption, in accordance with an advantageous embodiment.

FIG. 3 is a diagram illustrating a system that may be configured to utilize or support symmetric frequency-based encryption, in accordance with an advantageous embodiment. Referring to FIG. 3 there is shown a system 300.

The system 300 may comprise suitable logic, circuitry, interfaces, and/or code that may be operable to support encryption/decryption operations. The system 300 may correspond to, for example, the transmitting-side system 200 and/or the receiving-side system 210 of FIG. 2A. The system 300 may be configured to use or support use of one or more encryption algorithms that may be supported by the electronic device. Particularly, the system 300 may be configured to use symmetric frequency-based encryption, as described with respect to the previous figures, to facilitate encryption of transmitted data and/or decryption of received data. In this regard, the system 300 may be operable to, for example, generate and/or provide encryption keys for use in symmetric frequency-based encryption.

The system 300 may comprise, for example, one or more system processors 302, a system memory 304, a communication subsystem 310, an encryption/decryption engine 320, an input/output (I/O) component 330, and a signal generator 340. Nonetheless, while these elements are shown as components and/or subsystems of the system 300, in some instances, one or more of these elements (and/or other resources attributed to the system 300) may be separate and may actually be elements or components of any object, device, or system containing or using the system 300, but may still be utilized by and/or support operations of the system 300 (i.e., may be treated as 'logical' components of the system 300).

Each system processor 302 may comprise suitable logic, circuitry, interfaces, and/or code that may be operable to process data, and/or control and/or manage operations of the system 300, and/or tasks and/or applications performed therein. In this regard, the system processor 302 may be operable to configure and/or control operations of various components and/or subsystems of the system 300, by utilizing, for example, one or more control signals. The system processor 302 may enable execution of applications, programs and/or code, which may be stored in the system memory 304, for example.

The system memory 304 may comprise suitable logic, circuitry, interfaces, and/or code that may enable permanent and/or non-permanent storage, buffering, and/or fetching of data, code and/or other information, which may be used, consumed, and/or processed in the system 300. In this regard, the system memory 304 may comprise different memory technologies, including, for example, read-only memory (ROM), random access memory (RAM), Flash memory, solid-state drive (SSD), and/or field-programmable gate array (FPGA). The system memory 304 may store, for example, configuration data, which may comprise parameters and/or code, comprising software and/or firmware.

The communication subsystem 310 may comprise suitable circuitry, interfaces, logic, and/or code that may be operable to communicate data from and/or to the system 300, such as via one or more wired and/or wireless connections (e.g., via antennas). The communication subsystem 310 may be configured to support one or more wired protocols and/or interfaces, and/or one or more wireless protocols and/or interfaces, facilitating transmission and/or reception of signals to and/or from the system 300 and/or processing of transmitted or received signals in accordance with applicable wired or wireless protocols. Examples of wireless protocols or standards that may be supported and/or used by the communication subsystem 310 may comprise wireless personal area network (WPAN) protocols, such as Bluetooth (IEEE 802.15); near field communication (NFC) standards; wireless local area network (WLAN) protocols, such as WiFi (IEEE 802.11); cellular standards, including 2G/2G+ (e.g., GSM/GPRS/EDGE, and IS-95 or cdmaOne) and/or 3G/3G+ (e.g., CDMA2000, UMTS, and HSPA); 4G standards, such as WiMAX (IEEE 802.16) and LTE; Ultra-Wideband (UWB), and/or the like. Examples of wired protocols and/or interfaces that may be supported and/or used by the communication subsystem 310 may comprise Ethernet (IEEE 802.3), Fiber Distributed Data Interface (FDDI), and Integrated Services Digital Network (ISDN). Examples of signal processing operations that may be performed by the communication subsystem 310 may comprise, for example, filtering, amplification, analog-to-digital conversion and/or digital-to-analog conversion, up-conversion/down-conversion of baseband signals, encoding/decoding, encryption/decryption, and/or modulation/demodulation.

The encryption/decryption engine 320 may comprise suitable logic, circuitry, interfaces, and/or code that may be operable to perform encryption or decryption operations in the system 300, such as in accordance with one or more supported encryption protocols or algorithms, including asymmetric public key based algorithms (e.g., RSA), and/or symmetric private key based algorithms (e.g., AES). In some instances, the encryption/decryption engine 320 may be operable to support and/or implement use of symmetric frequency-based encryption.

The I/O subsystem 330 may comprise suitable circuitry, interfaces, logic, and/or code for enabling inputting and/or outputting information in the system 300. In this regard, the I/O subsystem 330 may support various types of inputs and/or outputs, including, for example, video, audio, and/or text. In this regard, dedicated I/O devices and/or components, external to or integrated within the system 300, may be utilized for inputting and/or outputting data during operations of the I/O subsystem 330. Examples of such I/O devices may comprise video I/O devices (e.g., displays), audio I/O devices (e.g., speakers or microphones), mice, keyboards, touch screens (or touchpads), and the like. For example, the I/O subsystem 330 may comprise one or more microphones 332, which may be configured to capture sound waves (including, e.g., audible, infrasound, and/or ultrasound signals) and/or other types of similar oscillation based signals (e.g., vibration), and/or one or more speakers 334, which may be configured to generate and/or output audio sound waves (including, e.g., audible, infrasound, and/or ultrasound signals) and/or other types of similar oscillation based signals (e.g., vibration). The microphone 332 and/or the speaker(s) 334 may be integrated into the system 300 and/or may be separate, physical components that may be coupled or connected to the electronic device (e.g., when needed). In some instances, user input obtained via the I/O subsystem 330, may be used to configure and/or modify various functions of particular components or subsystems of the system 300.

The signal generator 340 may comprise suitable logic, circuitry, interfaces, and/or code that may be operable to generate signals having particular profiles. In this regard, the signal generator 340 may be configured to generate signals comprising a plurality of frequencies, with one or more signal attributes applicable to the signal as whole and/or to particular components (e.g., notes) thereof.

The system 300 may be configured to perform and/or support use of symmetric frequency-based encryption/decryption, substantially as described with respect to FIGS. 2A-2C. For example, the encryption/decryption engine 320 may be configured to support and/or use symmetric frequency-based key generation and/or encryption/decryption. In this regard, the reference signal(s) used in generating the keys (and/or matrices based thereon) may be stored into the system 300 (e.g., maintained in the system memory 304). The reference signal(s) may be written into the system 300 (e.g., as sequence of musical notes, or numerical sequences corresponding thereto). The reference signal(s) may also be obtained and/or generated by the system 300. For example, the I/O subsystem 330 may allow inputting (e.g., via the microphone(s) 332) sequences of musical notes or other audio signals, which may then be processed for use in generating the encryption/decryption keys (or matrices based thereon). In some instances, the sequences of musical notes or other audio signals may be played back (e.g., to allow confirming correctness), such as via the speaker(s) 334. Alternatively, the reference signal(s) may be generated using the signal generator 340.

Figure 4A:
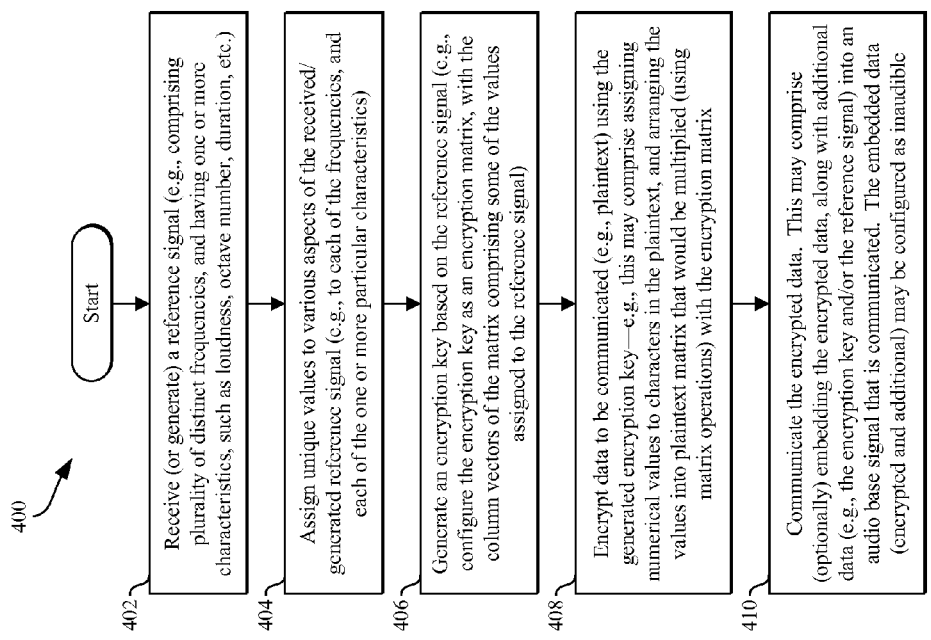
FIG. 4A is a flow chart that illustrates implementing of symmetric frequency-based encryption at the sending-side during data communications, in accordance with an advantageous embodiment.

FIG. 4A is a flow chart that illustrates implementing symmetric frequency-based encryption at the sending side during data communications, in accordance with an advantageous embodiment. Referring to FIG. 4A, there is shown a flow chart 400 comprising a plurality of steps, which may be performed by a system (e.g., the system 300) to enable using symmetric frequency-based encryption of data during communication of the data from the system.

In step 402, the system may receive (or generate) a reference signal, which may be used in generating encryption keys. In this regard, the reference may comprise a plurality of distinct frequencies, having one or more characteristics (e.g., such as loudness, octave, duration, etc.). In step 404, the system may assign unique values associated with various aspects of the reference signal. In this regard, unique values may be assigned to each of the frequencies, and/or to each of the one or more particular characteristics (e.g., for each frequency). For example, one or more unique values may be assigned to each frequency based on each characteristic (e.g., loudness, octave, duration, etc.) having one of a plurality of possible values. In step 406, an encryption key may be generated based on the reference signal, such as using the assigned unique values associated with various aspects thereof. In some instances, the encryption key may be configured as an encryption matrix, such as with the column vectors of the matrix comprising some of the values assigned to the reference signal, as described with respect to FIG. 2B for example. In some instances, steps 402-406 may be repeated for every data encryption. In other instances, however, steps 402-406 may only be performed when needed— i.e., these steps may be skipped if the encryption key has been generated before, and stored for re-use in subsequent data encryption. In this regard, the encryption key may be regenerated only in certain conditions (e.g., after particular timeout period and/or when there is reason to suspect that security of communication or other peer(s) may be compromised).

In step 408, the data that is to be communicated (e.g., plaintext) may be encrypted using the generated encryption key. In some instances, data encryption may comprise assigning numerical values to characters in the plaintext, and with the resultant sequence of values being arranged into a plaintext matrix that would be multiplied (using matrix operations) with the encryption matrix as part of the encryption process. In step 410, the encrypted data may be communicated and/or configured for transmittal to the receiving-side. This may comprise optionally embedding the encrypted data, along with additional data (e.g., the encryption key and/or the reference signal), into an audio base signal that is communicated and/or formatting the encrypted data and any additional data in accordance with particular audio file format. In some instance, the embedded data (encrypted and additional) may be configured as inaudible signals, for added measure of security, thus allowing for communication of the encrypted data transparently (i.e., undetected) during communication or play of the audio base signal.

Figure 4B:
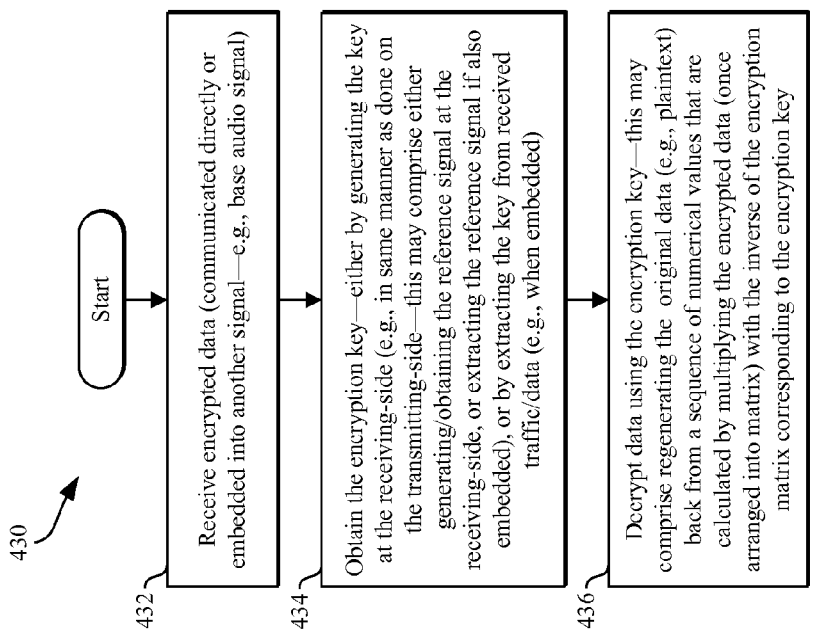
FIG. 4B is a flow chart that illustrates implementing of symmetric frequency-based encryption at the receiving-side during data communications, in accordance with an advantageous embodiment.

FIG. 4B is a flow chart that illustrates implementing of symmetric frequency-based encryption at the receiving-side during data communications, in accordance with an advantageous embodiment. Referring to FIG. 4B, there is shown a flow chart 430 comprising a plurality of steps, which may be performed by a system (e.g., the system 300) to enable using symmetric frequency-based decryption of data during reception of the data by the system.

In step 432, the system may receive encrypted data, which may either be communicated directly to the system, or embedded into another signal, base audio signal (which in turn can be communicated directly, peer-to-peer, or saved into a proper medium, such as CD, and read therefrom). In step 434, the system may obtain the encryption key. In this regard, the system may obtain the encryption key, such as by generating the key, in the same manner as what is done on the transmitting-side for use in encrypting the data (as described with respect FIG. 4). Generating the encryption at the receiving-side may entail, for example, generating the same reference signal that is used for key generation at the receiving-side, or extracting the reference signal from the received data (if it is embedded there). In some instances, the receiving-side system may simply obtain the encryption key by simply extracting the key from received traffic/data (e.g., when the key is embedded therein). In step 436, the system may decrypt the received encrypted data using the encryption key. In some instances, data decryption may entail performing particular steps that are necessary to undo (or mirror) particular data manipulation or processing done at the transmitting side as part of the encryption process. For example, data decryption may comprise regenerating the original data (e.g., plaintext) by mapping a sequence of values, which may be obtained (e.g., calculated) by multiplying the encrypted data (e.g., after it is arranged into a data matrix) by the inverse of the encryption matrix corresponding to the encryption key, to corresponding plaintext characters.

Other embodiments may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for cryptography using a symmetric frequency-based encryption algorithm.

Accordingly, the presently disclosed embodiments may be realized in hardware, software, or a combination of hardware and software. The present embodiments may be realized in a centralized fashion in at least one computer system, or in a distributed fashion where different elements are spread across several interconnected computer systems. Any kind of computer system or other system adapted for carrying out the methods described herein is suitable for the invention. A typical combination of hardware and software may be a general-purpose computer system with a computer program that, when being loaded and executed, controls the computer system such that it carries out the methods described herein.

The presently disclosed embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While described with reference to certain embodiments, it will be understood by those skilled in the art that various changes may be made and equivalents may be substituted without departing from the scope of the presently described embodiments. In addition, many modifications may be made to adapt a particular situation or material to the teachings without departing from its scope. Therefore, it is intended that the presently disclosed embodiments not be limited to the particular embodiment disclosed, but rather will include all embodiments falling within the scope of the appended claims.

What is claimed is:

1. A method of encrypting data, the method comprising:
    generating, by use of a processor, an encryption key based on an audio reference signal, wherein:
        the audio reference signal comprises a plurality of notes, and
        the generating of the encryption key is based on assigning values to the plurality of notes or to one or more attributes of the plurality of notes;
    configuring the encryption key as an encryption matrix comprising one or more of:
        a column vector representing frequency values of the plurality of notes,
        a column vector representing tone duration values of the plurality of notes, or
        a column vector representing amplitude values of the plurality of notes; and
    encrypting data based on the generated encryption key, wherein the encrypting of the data comprises encrypting plaintext values.

2. The method of claim 1, wherein the one or more attributes of the plurality of notes are selected from the group comprising: duration, loudness, amplitude, pitch, intonation, and octave.

3. The method of claim 1, wherein the encryption matrix comprises two or more column vectors, each of which comprising one or more of the values assigned to the plurality of notes or to the one or more attributes of the plurality of notes.

4. The method of claim 1, comprising generating a data matrix based on the data being encrypted, wherein the encryption comprises multiplying the data matrix with the encryption matrix.

5. The method of claim 4, comprising generating the data matrix by:
- assigning numerical values to each unique character used in the plaintext,
- converting the data being encrypted into a sequence of numerical values based on mapping of characters in the data, and
- arranging the sequence of numerical values into the data matrix.

6. The method of claim 1, comprising configuring the encrypted data for communication as a signal that is inaudible to humans.

7. The method of claim 1, comprising configuring the encrypted data for communication by:
- formatting the encrypted data into a standard audio file, or mixing the encrypted data with a base audio signal.

8. The method of claim 1, comprising communicating along with the encrypted data, one or both of the encryption key and the audio reference signal.

9. A system for encrypting data, comprising:
- one or more circuits that are configured for use in for encrypting data, the one or more circuits comprising at least one of a processor or memory, wherein the one or more circuits are operable to:
- generate an encryption key based on an audio reference signal, wherein:
  - the audio reference signal comprises a plurality of different frequencies, and
  - the generating of the encryption key is based on assigning values to the plurality of different frequencies or to one or more attributes of the audio reference signal;
- configure the encryption key as an encryption matrix comprising one or more of:
  - a column vector representing frequency values of the plurality of notes,
  - a column vector representing tone duration values of the plurality of notes, or
  - a column vector representing amplitude values of the plurality of notes; and
- encrypt data based on the generated encryption key, wherein the encrypting of the data comprises encrypting plaintext values.

10. The system of claim 9, wherein the one or more attributes of the audio reference signal are selected from the group comprising: duration, loudness, amplitude, pitch, intonation, and octave.

11. The system of claim 9, wherein the encryption matrix comprises two or more column vectors each of which comprising one or more of the values assigned to the plurality of different frequencies or to the one or more attributes of the audio reference signal.

12. The system of claim 9, wherein the one or more circuits are operable to generate a data matrix based on the data being encrypted, wherein the encryption comprises multiplying the data matrix with the encryption matrix.

13. The system of claim 12, wherein the one or more circuits are operable to generate the data matrix by:
- assigning numerical values to each unique character used in the plaintext,
- converting the data being encrypted into a sequence of numerical values based on mapping of characters in the data, and
- arranging the sequence of numerical values into the data matrix.

14. The system of claim 9, wherein the one or more circuits are operable to configure the encrypted data for communication as a signal that is inaudible to humans.

15. The system of claim 9, wherein the one or more circuits are operable to configure the encrypted data for communication by:
- formatting the encrypted data into a standard audio file, or mixing the encrypted data with a base audio signal.

16. The system of claim 9, wherein the one or more circuits are operable to communicate along with the encrypted data, one or both of the encryption key and the audio reference signal.

* * * * *